United States Patent [19]

Cuscurida et al.

[11] Patent Number: 4,465,858

[45] Date of Patent: Aug. 14, 1984

[54] PROCEDURE FOR THE PARTIAL ALKOXYLATION OF POLYOXYALKYLENEAMINES

[75] Inventors: Michael Cuscurida; Howard P. Klein, both of Austin, Tex.

[73] Assignee: Texaco Inc., White Plains, N.Y.

[21] Appl. No.: 515,405

[22] Filed: Jul. 20, 1983

[51] Int. Cl.$^3$ .............................................. C07C 85/00
[52] U.S. Cl. ..................................................... 564/477
[58] Field of Search ........................................ 564/477

[56] References Cited

U.S. PATENT DOCUMENTS

| | | | |
|---|---|---|---|
| 2,823,236 | 2/1958 | Lowe et al. | 564/477 X |
| 3,255,253 | 6/1966 | Kuryla | 564/477 X |
| 3,301,888 | 1/1967 | Cyba | 564/477 X |
| 3,551,461 | 12/1970 | Thayer | 564/477 X |
| 3,927,104 | 12/1975 | Miller et al. | 564/477 X |
| 4,323,709 | 4/1982 | Kwong | 564/477 X |
| 4,329,505 | 5/1982 | Kwong et al. | 564/477 X |

FOREIGN PATENT DOCUMENTS 914850 11/1972 Canada ................................. 403/35

Primary Examiner—Paul F. Shaver
Attorney, Agent, or Firm—Jack H. Park; Kenneth R. Priem; David L. Mossman

[57] ABSTRACT

A non-catalytic procedure for reacting polyoxyalkyleneamines with alkylene oxides in the presence of 5 to 15 wt. % water is described. With this inventive procedure the addition of the oxides may be done quickly and at the surprisingly low temperature of between 75° and 85° C. The proportion of tertiary amine in the resulting product is less than 90%, indicating partial alkoxylation. This technique is particularly suitable for propoxylation which is difficult to achieve by conventional means.

12 Claims, No Drawings

PROCEDURE FOR THE PARTIAL ALKOXYLATION OF POLYOXYALKYLENEAMINES

CROSS-REFERENCE TO RELATED APPLICATION

This application is related to U.S. patent application Ser. No. 515,406, relating to total alkoxylation of polyoxyalkyleneamines, filed of even date.

BACKGROUND OF THE INVENTION

1. Field of the Invention

The invention relates to methods for the alkoxylation of polyoxyalkyleneamines and more particularly relates to non-catalytic methods for partially alkoxylating polyoxyalkyleneamines at low temperatures in the presence of water.

2. Other Methods in the Field of the Invention

The general concept of alkoxylating polyoxyalkyleneamines is well known. However, the higher molecular weight polyoxyalkyleneamines react with higher oxides, such as propylene oxides, only with great difficulty, requiring high temperatures and long reaction times.

A number of schemes for alkoxylation have been developed. U.S. Pat. Nos. 2,902,478 and 3,865,806 both describe techniques for reacting initiators having 4 to 8 active hydrogens with alkylene oxides in the absence of added water but using trialkylamines as catalysts for the reaction. The reaction temperatures for this method range from 70° to 160° C., preferably 80° to 90° C. Alkylene oxides may also be added to the reaction product of phenol, alkanolamine and formaldehyde according to U.S. Pat. No. 3,297,597. Here the process is performed in the absence of water at a temperature in the range from 30° to 200° C., although all of the examples therein are conducted at temperatures of 90° C. or higher.

Another catalytic method is described in U.S. Pat. No. 4,075,130 where polyoxypropylene polyamines of 190 to 3,000 molecular weight may be reacted with alkylene oxides in the presence of acidic or basic catalysts at a temperature in the range of 50° to 200° C., apparently in the absence of water. These materials are subsequently used as defoaming agents. Aqueous ammonia is used as a catalyst for this reaction conducted at 40° to 120° C. according to the method of U.S. Pat. No. 4,166,172.

Non-catalytic methods include Canadian Pat. No. 914,850 which details the reaction of polyoxyalkylene polyamines with alkylene oxides at 125° to 170° C. in the absence of water.

A partially cyanoalkylated polyoxyalkylene polyamine useful as a coupling agent in polyurethanes is described and made according to the description in U.S. Pat. No. 3,666,788.

It would be advantageous to have a method for alkoxylating polyoxyalkyleneamines at low temperatures, in the absence of a catalyst to give a product having less than 90% of the amine functions as tertiary amines (total alkoxylation).

SUMMARY OF THE INVENTION

The invention concerns a method for partially alkoxylating polyoxyalkyleneamines where the first step is adding at least one alkylene oxide to an aqueous polyoxyalkyleneamine. The alkylene oxide should have 2 to 8 carbon atoms, and the polyoxyalkyleneamine has a molecular weight of from 200 to 5,000. The proportion of water ranges from 5 to 15 wt.% based on the polyoxyalkyleneamine present, and the addition is conducted at a temperature in the range between about 75° and 85° C. The proportion of alkylene oxide used is less than that necessary to totally alkoxylate the polyoxyalkyleneamine. Subsequently, the reactant mixture is digested at a temperature at or above 75° C. to give an alkoxylated polyoxyalkylene product having a tertiary amine content of less than 90%.

DETAILED DESCRIPTION OF THE PREFERRED EMBODIMENTS

The polyoxyalkyleneamine reactants of this invention are well known. They may be made by treating the corresponding polyoxyalkylene polyols with ammonia and hydrogen over a catalyst prepared by the reduction of a mixture of the oxides of nickel, copper and chromium. For more details on the preparation of the polyoxyalkyleneamines used herein, see U.S. Pat. No. 3,654,370, incorporated by reference herein. A particularly popular brand of amines are the JEFFAMINE ® polyoxypropyleneamines sold by Texaco Chemical Company.

The technique of this invention is particularly useful for the higher molecular weight amines. The polyoxyalkylene polyamines should have molecular weights in the range of 200 to 5,000. Preferably, the "alkylene" moiety has between 2 and 4 carbon atoms such as ethylene, propylene and 1,2-butylene.

More preferably, the polyoxyalkylene amines have one of the following formulas

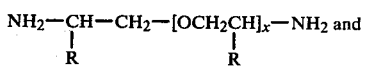

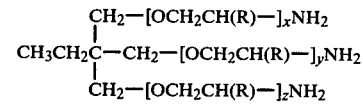

where each R can independently be hydrogen or a lower alkyl group of 1 to 4 carbon atoms, x can range from 1 to 50 and the sum of x, y and z can range from 5.3 to 84. As stated above, the alkylene moiety is preferably ethylene, propylene and 1,2-butylene. Thus R is more preferably hydrogen or an alkyl group of 1 or 2 carbon atoms.

Permissible alkylene oxide reactants include any alkylene oxide having from 2 to 8 carbon atoms, preferably ethylene oxide, propylene oxide, 1,2-butylene oxide, styrene oxide and mixtures thereof. Especially preferred are propylene oxide alone or together with ethylene oxide. Although the method works well with only ethylene oxide, the real advantage is in the addition of propylene oxide and higher oxides since they cannot be added well by any other technique.

An alternate embodiment of the invention involves first adding a small amount of ethylene oxide to the polyoxyalkyleneamine (from 0.25 to 10 wt.% total alkylene oxide charge), and then in a separate subsequent step finishing the reaction by adding propylene oxide under identical reaction conditions. Digestion takes place after the addition of both oxides.

The amount of alkylene oxide added to the amine reactant depends on the desires of the experimenter. The proportion of alkylene oxide must be less than that required to totally alkoxylate the amine. For example, if the polyoxyalkyleneamine is a diamine where both amino groups are primary, the moles of alkylene oxide should be less than four for each mole of amine reacted. If a triamine is used and each amino group is primary, the mole ratio of alkylene oxide to amine must be less than 6:1.

From about 5 to 15 wt.% water must be present, based on the quantity of amine reactant. Polyoxyalkyleneamine already in aqueous solution is permissible, otherwise the water should be added.

One form of the reaction may be diagrammed as follows

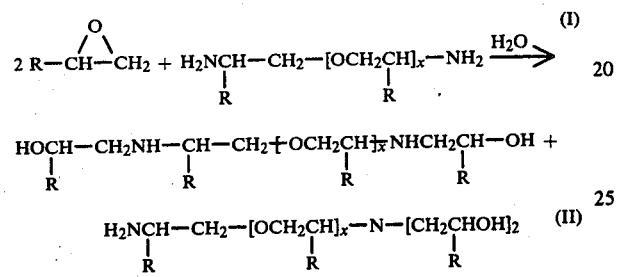

where R and x are as above. The reaction would be expected to produce 50 to 95% of product (I) and 5 to 50% of product (II).

Generally, the reaction is conducted by first adding water to the polyoxyalkyleneamine and then adding and reacting the alkylene oxide at an elevated temperature. The temperature of the addition step should be in the range from 75° to 85° C., which is surprisingly low when compared to some of the prior art methods. It is also unusual that the alkylene oxide can be introduced rather quickly, in less than half an hour, whereas in prior methods the period of addition is typically ten hours.

Subsequent digestion of the reactants generally occurs at a temperature in the range of about 75° to 135° C. for about three hours, although the time is not critical. This digestion temperature is surprisingly low compared to the prior art. The desired product is usually separated out by stripping. Note that no catalyst is used during the process.

The reaction may be conducted in either a batch or continuous mode. Pressures in the range from ambient to 100 psig are permissible. The procedure of this invention also appears applicable for the alkoxylation of alkyl polyoxyalkyleneamines and amination products of propoxylated fatty alcohols in the 300 to 1,000 molecular weight range.

The partially alkoxylated products of this invention would find application in the preparation of polyurea coatings, reaction injection molding (RIM) elastomers, potting and encapsulation compounds and polymer polyol preparation. In general, they would be expected to have utility where a less reactive polyoxyalkyleneamine would be advantageous. These partially alkoxylated polyoxyalkyleneamines should be less toxic than prior art cyanoalkylated derivatives (see U.S. Pat. No. 3,666,788).

Tertiary amine groups are well known for their catalytic properties for the reaction of polyols and polyisocyanates to make polyurethanes. The products of this invention can serve particularly as crosslinkers in the preparation of urethane foams, elastomers and adhesives. For more details on the production of polyurethane foams, examples of which will be presented herein, see U.S. Pat. No. 3,297,597, incorporated by reference herein, among others.

The invention will be further illustrated by the following examples which are not intended to limit the invention.

EXAMPLE 1

This example will illustrate the preparation of the partially alkoxylated polyoxyalkyleneamines of this invention.

Into a five-gallon kettle were charged 1200 g of a 2,000 molecular weight polyoxypropyleneamine (JEFFAMINE ® D-2000 made by Texaco Chemical Co.) and 120 g water. The reactor was then evacuated and purged with prepurified nitrogen. Ethylene oxide (8.5 g) was then reacted at 80° C. Propylene oxide (77 g) was then reacted at 80°–85° C. The reaction mixture was then digested two hours at 85° C. This was followed by a one-hour digestion at 125° C. The reaction mixture was then vacuum stripped to a minimum pressure at 125° C. and the product polish filtered. The finished product was a light yellow liquid which had the following properties:

| | |
|---|---|
| Total acetylatables, meq/g | 1.7 |
| Total amine, meq/g | 0.94 |
| Primary amine, meq/g | 0.07 |
| Secondary amine, meq/g | 0.512 |
| Tertiary amine, meq/g | 0.34 |
| Viscosity, °F., cs | |
| 77 | 574 |
| 100 | 262 |

Since the tertiary amine content is only 36% and less than 90%, the product is considered only partially alkoxylated. Further evidence is the presence of large amounts of secondary amine.

EXAMPLE 2

This example will illustrate a scale-up preparation of Example 1.

Into a ten-gallon kettle were charged 40 pounds of the 2,000 molecular weight polyoxypropyleneamine and 4 pounds of water. The reactor was then evacuated and purged with prepurified nitrogen. Ethylene oxide (0.28 lb) was then reacted at 85° C. Propylene oxide (2.5 lb) was then reacted at 84°–85° C. The reaction mixture was then digested two hours at 80°–85° C. This was followed by a one-hour digestion at 125° C. The reaction mixture was then stripped to a minimum pressure at 125° C. and polish filtered at 110° C. with the aid of 50 g of filter aid (Hyflo Supercel). The finished product was a light yellow liquid which had the following properties:

| | |
|---|---|
| Total acetylatables, meq/g | 1.81 |
| Total amine, meq/g | 0.95 |
| Primary amine, meq/g | 0.088 |
| Secondary amine, meq/g | 0.59 |
| Tertiary amine, meq/g | 0.33 |
| Water, wt. % | 0.01 |
| Viscosity, °F., cs | |
| 77 | 560 |

| | |
|---|---|
| 100 | 265 |

The tertiary amine content is 35%, indicating partial alkoxylation.

EXAMPLE 3

This example will illustrate the reduced activity of the partially alkoxylated 2000 m.w. polyoxypropyleneamine of Example 2 with polyisocyanates as compared to the unmodified polyoxypropyleneamine. In these experiments the partially alkoxylated polyoxypropyleneamine was reacted with a stoichiometric quantity of polyisocyanate and the gel time of the reaction determined. Gel time was defined as that point at which the reaction mixture solidified or would not flow when subjected to the mixing action of a metal spatula. The more active amine hydrogens, the faster the gel time. Results are shown in the following table.

| | 3a | 3b | 3c | 3d | 3e | 3f |
|---|---|---|---|---|---|---|
| Charge, pbw | | | | | | |
| 2,000 m.w. polyoxypropylene-amine[1] | 30 | — | 10 | — | — | 20 |
| Partially alkoxylated poly-oxypropyleneamine[2] | — | 30 | — | 10 | 25 | — |
| ISONATE ® 143L[3] | 4.6 | 8.2 | — | — | — | — |
| Toluene diisocyante | — | — | — | — | 4.1 | 1.8 |
| Isophorone diisocyanate | — | — | 1.11 | 2.0 | — | — |
| eq —NH$_2$/—NCO | 1.05 | — | 1.0 | — | — | 1.0 |
| eq —NH + —OH/NCO | — | 1.0 | — | 1.0 | 1.05 | — |
| Results | | | | | | |
| Gel time, min. | Immediate | 30 | Immediate | 60 | 30 | Immediate |

[1]JEFFAMINE ® D-2000; Texaco Chemical Co.
[2]Partially alkoxylated 2000 m.w. polyoxypropyleneamine of Example 2.
[3]Liquefied diphenylmethane diisocyante; Upjohn Chemical Co.

EXAMPLE 4

This example will illustrate the use of the partially alkoxylated polyoxyalkyleneamine of Example 2 in the preparation of a low density packaging foam. Foam of this type would be suitable for use in the packaging of shock-sensitive objects.

Formulations, details of preparation, and properties are shown in the following table.

| | A | B | C |
|---|---|---|---|
| Formulation, pbw | | | |
| Partially alkoxylated poly-oxypropyleneamine of Ex. 2 | 45 | 60 | 75 |
| Twelve mole ethylene oxide adduct of nonylphenol[1] | 10 | 10 | 10 |
| Aromatic amino polyol[2] | 45 | 30 | 15 |
| Water | 20 | 20 | 20 |
| Fluorocarbon R-11 | 35 | 35 | 35 |
| L-6202 silicone[3] | 1.5 | 2.0 | 2.0 |
| Two mole propylene oxide adduct of dimethylaminopropylamine[4] | 5.0 | 5.0 | 5.0 |
| 2.7 functionality polymeric isocyanate[5] | 140.5 | 140.5 | 140.5 |
| Details of Preparation | | | |
| Cream time, sec. | 12 | 11 | 12 |
| Rise time, sec. | 60 | 60 | 60 |
| Gel time, sec. | 60 | 65 | 65 |
| Properties | | | |
| Density, pcf | 0.64 | 0.51 | 0.51 |
| Appearance | Fine open celled foam | | |

[1]SURFONIC ® N-120 made by Texaco Chemical Co.
[2]THANOL ® R-650-X made by Texaco Chemical Co. according to U.S. Pat. No. 4,137,265.
[3]Silicone surfactant made by Union Carbide Chemical Corp.
[4]THANCAT ® catalyst made by Texaco Chemical Co.
[5]MONDUR ® MR made by Mobay Chemical Co.

EXAMPLE 5

This example will illustrate the use of the partially alkoxylated polyoxypropyleneamine in the preparation of flexible urethane foams. It will further show that incorporation of 10–20% of these modified amines into the foam formulation serves to increase the tensile and elongation properties of the foams without adversely affecting other properties.

Formulations, details of preparation, and foam properties are shown in the following table.

| | D | E | F |
|---|---|---|---|
| Formulation, pbw | | | |
| 3000 m.w. PO/EO adduct of glycerin[1] | 100 | 90 | 80 |
| Partially alkoxylated poly-oxypropyleneamine[2] | — | 10 | 20 |
| Water | 4.0 | 4.0 | 4.0 |
| L-6202 silicone | 1.0 | 1.0 | 1.0 |
| 50% solution of stannous octoate in dioctylphthalate[3] | 0.5 | 0.3 | 0.3 |
| 33% solution of triethylene-diamine in propylene glycol[4] | 0.3 | 0.3 | 0.3 |
| Toluene diisocyanate | 49.7 | 50.4 | 51.0 |
| Isocyanate index | 1.05 | 1.05 | 1.05 |
| Details of preparation | | | |
| Cream time, sec. | 12 | 12 | 12 |
| Rise time, sec. | 82 | 97 | 105 |
| Postcure, °C., hr | 1 | 1 | 1 |
| Properties | | | |
| Density, pcf | 1.6 | 1.59 | 1.55 |
| Hardness by Chatillon gauge, 25%, lb | 5.02 | 4.8 | 4.8 |
| Tensile, psi | 12.6 | 13.8 | 15.4 |
| Elongation, % | 118 | 130 | 146 |
| Tear, pli | 1.1 | 1.7 | 1.1 |
| Compression set, | | | |
| 50% | 4.8 | 5.5 | 7.7 |

-continued

|   | D | E | F |
|---|---|---|---|
| 90% | 5.5 | 5.7 | 8.6 |

[1]THANOL ® F-3016 made by Texaco Chemical Co.
[2]Product of Example 2.
[3]Catalyst T-10 made by M & T Chemicals
[4]THANCAT ® TD-33 catalyst made by Texaco Chemical Co.

EXAMPLES 6 AND 7

Using the procedure of Example 1, a 230 molecular weight polyoxypropyleneamine (JEFFAMINE® D-230) and a 400 molecular weight polyoxypropyleneamine (JEFFAMINE D-400) were partially alkoxylated. Reaction charges, details of preparation and properties are shown in the following table.

|  | A | B |
|---|---|---|
| Charge | | |
| JEFFAMINE D-230, lb | 40 | — |
| JEFFAMINE D-400, lb | — | 40 |
| Water, lb | 4 | 4 |
| Propylene oxide, lb | 20.6 | 12.2 |
| Reaction Details | | |
| Propylene oxide addition time, hr | 0.4 | 0.25 |
| Reaction temperature, °C. | 80–85 | 80–85 |
| Digestion temperature, °C. | 80–125 | 80–125 |
| Digestion time, hr | 3 | 2 |
| Properties | | |
| Total acetylatables, meq/g | 9.44 | 6.26 |
| Total amine, meq/g | 5.35 | 3.46 |
| Primary amine, meq/g | 0.68 | 0.35 |
| Secondary amine, meq/g | 3.25 | 2.05 |
| Tertiary amine, meq/g | 1.42 | 1.06 |
| Water, wt. % | 0.04 | 0.01 |
| Color, Pt-Co | 30–40 | 20 |
| Viscosity, 77° F., cs | 1169 | 638 |

Many modifications may be made in the method of this invention without departing from the spirit and scope thereof which are defined only by the appended claims. For example, one skilled in the art could modify the modes of addition, reactant proportions, water amount and reaction temperature to optimize the process.

We claim:
1. A method for partially alkoxylating polyoxyalkyleneamines comprising
a. adding at least one alkylene oxide to an aqueous polyoxyalkyleneamine where
  (1) the alkylene oxide has from 2 to 4 carbon atoms,
  (2) the polyoxyalkyleneamine has a molecular weight of from 200 to 5,000,
  (3) the proportion of water ranges from 5 to 15 wt.% based on the polyoxyalkyleneamine quantity, and
  (4) the addition is conducted at a temperature between about 75° and 85° C., and
  (5) the proportion of alkylene oxide is less than that necessary to totally alkoxylate the polyoxyalkyleneamine, and
b. digesting the mixture of oxide and polyoxyalkyleneamine at a temperature between 75° C. and 135° C. to give an alkoxylated polyoxyalkyleneamine product having a tertiary amine content of less than 90%.

2. The method of claim 1 in which the polyoxyalkyleneamine reactant is selected from the group consisting of polyoxypropylene diamines and polyoxypropylene triamines.

3. The method of claim 1 in which the polyoxyalkyleneamine reactant is selected from the group having the formulas

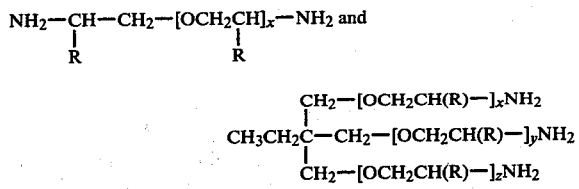

where each R can independently be hydrogen or a lower alkyl group of 1 to 4 carbon atoms, x can range from 1 to 50 and the sum of x, y and z can range from 5.3 to 84.

4. The method of claim 1 in which the alkylene oxide is chosen from the group consisting of propylene oxide, ethylene oxide and mixtures thereof.

5. The method of claim 1 in which the addition step of alkylene oxide to the aqueous polyoxyalkyleneamine is completed in less than half an hour.

6. A method for partially alkoxylating polyoxyalkyleneamines comprising
a. adding an alkylene oxide component to an aqueous polyoxyalkyleneamine where
  (1) the alkylene oxide component is selected from the group consisting of propylene oxide and a mixture of propylene oxide and ethylene oxide,
  (2) the polyoxyalkyleneamine has a molecular weight of from 200 to 5,000 and is selected from the group consisting of polyoxypropylene diamines and polyoxypropylene triamines,
  (3) the proportion of water ranges from 5 to 15 wt.% based on the polyoxyalkyleneamine quantity, and
  (4) the addition is conducted at a temperature between 75° and 85° C., and
  (5) the proportion of alkylene oxide component is less than that necessary to totally alkoxylate the polyoxyalkyleneamine, and
b. digesting the mixture of oxide component and polyoxyalkyleneamine at a temperature between about 75° to 135° C. to give an alkoxylated polyoxyalkyleneamine product having a tertiary amine content less than 90%.

7. The method of claim 6 in which the polyoxyalkyleneamine reactant is selected from the group having the formulas

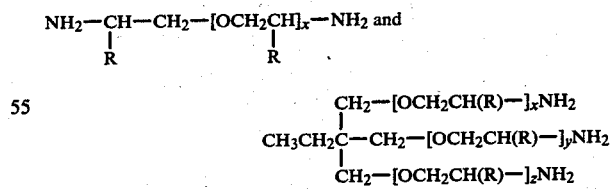

where each R can independently be hydrogen or a lower alkyl group of 1 to 4 carbon atoms, x can range from 1 to 50 and the sum of x, y and z can range from 5.3 to 84.

8. The method of claim 6 in which the alkylene oxide component addition step is completed in less than half an hour.

9. A method for partially alkoxylating polyoxyalkyleneamines comprising a. adding ethylene oxide to an aqueous polyoxyalkyleneamine where
  (1) the polyoxyalkyleneamine has a molecular weight of from 200 to 5,000,
  (2) the proportion of water ranges from 5 to 15 wt.% based on the polyoxyalkyleneamine quantity,
  (3) the addition is conducted at a temperature between 75° and 85° C., and
  (4) the amount of ethylene oxide is about 0.25 to 10 wt.% of the total alkoxide proportion,
b. subsequently adding propylene oxide to the reactant mixture under identical conditions as in step a., where the total amount of alkylene oxide proportion is less than that necessary to totally alkoxylate the polyoxyalkyleneamine, and
c. digesting the mixture of reactants at a temperature between 75° C. and 135° C. to give an alkoxylated polyoxyalkyleneamine product having a tertiary content of from 90 to 100%.

10. The method of claim 9 in which the polyoxyalkyleneamine reactant is selected from the group consisting of polyoxypropylene diamines and polyoxypropylene triamines.

11. The method of claim 9 in which the polyoxyalkyleneamine reactant is selected from the group having the formulas

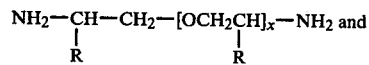

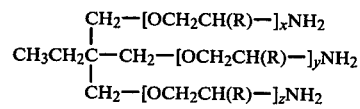

where each R can independently be hydrogen or a lower alkyl group of 1 to 4 carbon atoms, x can range from 1 to 50 and the sum of x, y and z can range from 5.3 to 84.

12. The method of claim 9 in which the addition steps a. and b. are each completed in less than half an hour.

* * * * *